Oct. 14, 1952 W. A. WILL 2,613,543
DAMPER MOTOR
Filed May 20, 1949
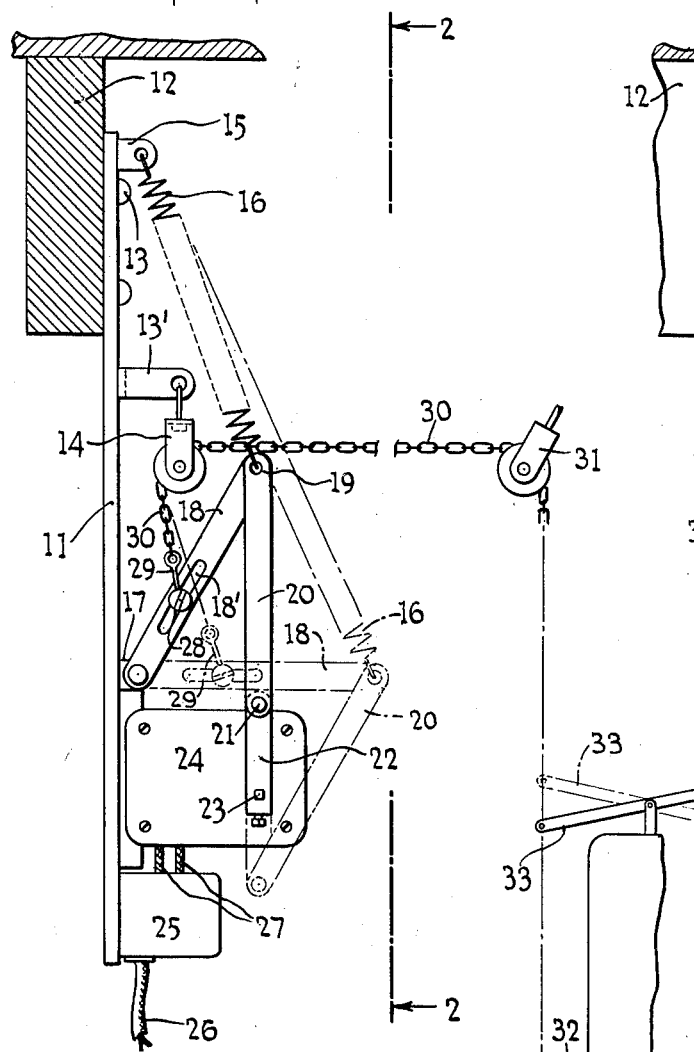
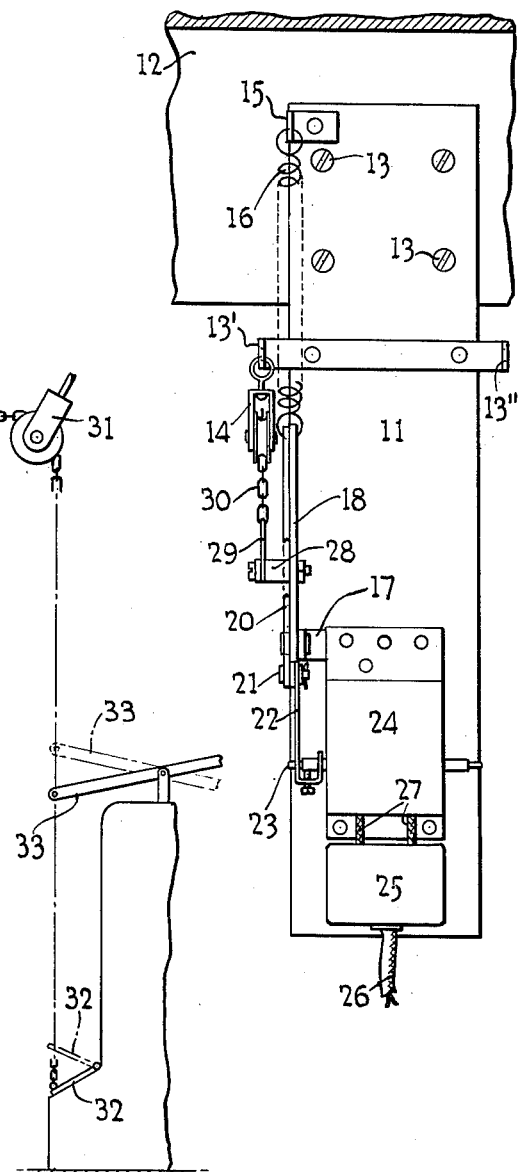
INVENTOR
WILBERT A. WILL
BY
Dicke + Padlon
ATTORNEYS Patented Oct. 14, 1952

2,613,543

UNITED STATES PATENT OFFICE 2,613,543

DAMPER MOTOR

Wilbert A. Will, New Bremen, Ohio, assignor to Crown Controls Company, Inc., New Bremen, Ohio, a corporation of Ohio Application May 20, 1949, Serial No. 94,314

11 Claims. (Cl. 74—99)

This invention relates to an improved damper motor and has for an object to provide a damper operator of the type which provides for spring return of the operator to draft-closed position upon the occurrence of a power failure. Another object is to provide such a device with linkage means associated with the usual half turn operating shaft in such a way that, when the dampers are in draft-open position, a suitable spring will apply torque to the operating shaft in a reverse direction for rotating said shaft substantially a half revolution and permitting the dampers to operate to draft-closed position upon the occurrence of a power failure.

Another object is to provide such a device in which the damper motor proper, the said linkage, the said spring, the motor pulley or pulleys and the transformer (if used) are all mounted on a single panel. This panel is adapted to be nailed or otherwise fastened to floor joists or to a wall with the result that the various parts are all accurately located in proper relation to each other.

Other objects will appear from the following description of an illustrative embodiment of the invention taken together with the attached drawings wherein:

Fig. 1 is an elevational view of a device embodying the present invention, mounted in position on a floor joist and showing more or less schematically connections to the draft damper of a furnace; and Fig. 2 is a front view of the device of Fig. 1.

Referring to said drawings the number 11 indicates a panel preferably of sheet steel having its edges bent back to increase its stiffness. In use, this panel is usually attached to a floor joist 12, or to a partition or post, as by screws 13. As shown, it is provided with a bracket, which has outwardly extending portions 13' and 13" from which are supported a pulley or pulleys 14 (only one of which is shown in the drawings). The panel also carries a bracket 15 to which is attached one end of a spring 16. The panel is also shown formed with a bracket 17 to which is pivoted an arm 18, the other end of which is pivoted at 19 to a link 20, the other end of which link is pivoted, as at 21, to a crank arm 22 mounted on the operating shaft 23 of the damper motor 24. The damper motor comprises as usual a housing which contains an electric motor and reduction gearing which is connected to drive the output or operating shaft 23. Also mounted on the panel 11 is shown a transformer 25 to which power is supplied through the extension cord 26 and power from which is delivered through conductors 27 to the damper motor.

The link 18 is preferably formed with a slot 18' in which is located at different positions of adjustment the stud 28 to which is pivoted the link 29 connected to the chain 30. The chain 30 passes through pulley 14 and usually through another pulley 31, suitably supported, and thence to the draft damper 32 of a furnace. It is frequently also connected to a beam 33 forming a part of the furnace, the other end of which beam is usually connected to operate the usual check damper in such a way that, when the draft damper 32 is closed, the check damper (not shown) is open and vice versa. In cases where the furnace is not provided with such a beam, another crank 22 may be attached to the other end of shaft 23, usually 180° displaced from the crank 22 as shown. From such a crank another chain leads through a pulley attached to bracket 13" and thence to the check damper.

The damper motor 24 may be of the type disclosed in Carl H. Dicke's application, S. N. 107,683, filed July 30, 1949, or any other type of damper motor in which the operating shaft is rotated forwardly through half a revolution from draft-closed to draft-open position and electromagnetic means are provided to hold the motor in that position against the action of a spring or weight, with the result that if the supply of current to the damper motor is cut off, as in the event of power failure, the motor is turned reversely under action of such spring or weight to the position where the draft damper is closed and the check damper is open. This is to assure that in cases of power failure, the furnace will be controlled to low-heat position as a safety measure.

In the drawings, the parts are shown in draft-closed position. Such devices are usually operated under the control of a room thermostat which closes a circuit when the temperature in the space controlled falls to a certain point. Such circuits are connected to the damper motor through conductors, not shown. When the thermostat calls for heat, the damper motor 24 is energized to rotate the shaft 23 one-half revolution from the position shown in full lines. When this occurs, the crank 22 will be turned from the upwardly extending position shown to the downwardly extending position shown in the dotted lines. When this occurs, the link 20 will be moved to the dotted line position shown in Fig. 1 drawing the arm 18 to the dotted line position shown. During this time, the stud 28 is moved correspondingly and thereby draws the chain so as to move the draft damper 32 to the dotted line position shown. At the same time, the beam 33 is correspondingly moved to close the check damper. It will be noted that while the link 20 is in line with the crank 22 in the full line position shown, it is at an angle to the crank 22 in the dotted line position shown so that the pull of the spring 16 will tend to rotate the shaft 23 counter-clockwise. The linkage shown, therefore, has the advantage that, although the motor shaft 23 may have a 180° movement, the returning force originating in the spring 16, and the forces due to the weight of the dampers, is such as to impart a counter-clockwise torque to the shaft 23.

Another important advantage is that a combination of parts is provided in which the damper motor and the return spring therefor are amounted in a definite relation to each other at the factory and this is effected irrespective of how the spring is connected to the damper motor. In devices as made heretofore it was necessary to first find a suitable mounting place for the damper motor, then for the pulleys and then find a point of attachment for the spring. It is most important that the spring be attached at just the right place both as to distance and as to direction relative to the damper motor. This required extra time and materials and skill not possessed by most installation and service men. These difficulties are overcome by the illustrative construction shown and described.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow:

I claim:

1. In a damper regulator mechanism, a damper motor comprising a housing containing an electric motor, reduction gearing and an output shaft extending therefrom, which output shaft turns 180° from one position to another, the combination of a support for said damper motor, an arm pivotally mounted on said support adjacent said damper motor, a link pivoted to said arm, a crank carried by said output shaft and pivoted to the other end of said link and a spring connected at one end to said support and at its other end to said link.

2. In a damper regulator mechanism, a damper motor comprising a housing containing an electric motor, reduction gearing and an output shaft extending therefrom, which output shaft turns approximately one half turn from one position to another, the combination of a support for said damper motor, a crank carried by said output shaft, and a spring connected at one end to said support and having connections at its other end to said crank.

3. In a damper regulator mechanism, a damper motor comprising a housing containing an electric motor, reduction gearing and an output shaft extending therefrom, which output shaft turns approximately one half turn from one position to another, the combination of a support for said damper motor, a crank carried by said output shaft, at least one pulley supported by the damper motor support and adapted to guide a chain or the like operated by said crank, and a spring connected at one end to said damper motor support and having connections at its other end to said crank.

4. As a unitary article of manufacture the combination which comprises a support panel arranged for attachment to a support, a damper regulator motor mounted on said panel comprising a housing containing an electric motor, reduction gearing and an output shaft extending therefrom, which output shaft is provided with chain actuating means, at least one pulley for a chain adapted to be actuated by said damper regulator motor, a chain connected to said chain actuating means and extending over said pulley toward cooperative engagement with a damper means carried by said panel and adapted to support said pulley in a predetermined relation to said chain actuating means, and a spring connected at one of its ends to said support panel and at its other end to said chain actuating device.

5. As a unitary article of manufacture the combination which comprises a support panel arranged for attachment to a support, a damper regulator motor mounted on said panel comprising a housing containing an electric motor, reduction gearing and an output shaft extending therefrom, which output shaft is provided with chain actuating means, at least one pulley for a chain adapted to be actuated by said damper regulator motor, a chain connected to said chain actuating means and extending over said pulley toward cooperative engagement with a damper means carried by said panel and adapted to support said pulley in a predetermined relation to said chain actuating means, a spring connected at one of its ends to said support panel and at its other end to an arm pivoted to said panel, and a link connected to said arm and to said chain actuating device.

6. The combination according to claim 1 together with means pivotally attached to said link and adapted for attachment to a damper operating chain or the like.

7. The combination according to claim 1 together with means which may be pivotally attached to said link at various points along the length of said link and adapted for attachment to a damper operating chain or the like.

8. The combination according to claim 5 together with means pivotally attached to said link and adapted for attachment to said chain.

9. The combination according to claim 5 together with means which may be pivotally attached to said link at various points along the length of said link and adapted for attachment to said chain.

10. In a damper regulator mechanism, a damper motor comprising a housing containing an electric motor, reduction gearing and an output shaft extending therefrom, which output shaft turns 180° from one position to another, the combination of a support for said damper motor in a plane parallel to the axis of said output shaft, an arm pivotally mounted at its inner end on said support adjacent said damper motor, a chain connected to said arm intermediate the ends thereof, a pulley on said support about which said chain is passed for extension to a damper, a link having its one end pivotally connected to the outer end of said arm, a crank secured to said output shaft and pivotally connected to the other end of said link, and a tension spring anchored at its base end to said support and connected at its outer end to the said one end of said link.

11. A damper regulator mechanism according to claim 10, characterized in that in one position of the mechanism said crank and link are centered and aligned with respect to one another and said output shaft, and said arm is constrained to occupy a sloping inclined position with respect to the link, said arm being longer than the distance from said support to said output shaft whereby movement of said output shaft from said one position to the other position is accompanied by a rocking motion of said link out of alignment with said crank and a corresponding shifting outward of the outer end of said spring with respect to the base end thereof.

WILBERT A. WILL.

REFERENCES CITED

The following references are of record in the file of this patent:

UNITED STATES PATENTS

| Number | Name | Date |
|---|---|---|
| 202,052 | Rouse | Apr. 2, 1878 |
| 417,966 | Willmer | Dec. 24, 1889 |
| 461,055 | Shepler | Oct. 13, 1891 |
| 505,270 | Hicks et al. | Sept. 17, 1893 |
| 506,204 | Button | Oct. 10, 1893 |
| 1,164,323 | Andrews et al. | Dec. 14, 1915 |
| 1,887,517 | Reutner | Nov. 15, 1932 |